(12) United States Patent
Kim et al.

(10) Patent No.: US 12,211,510 B2
(45) Date of Patent: Jan. 28, 2025

(54) ELECTRONIC DEVICE AND CONTROL METHOD THEREOF

(71) Applicant: SAMSUNG ELECTRONICS CO., LTD., Suwon-si (KR)

(72) Inventors: Soofeel Kim, Suwon-si (KR); Jina Ham, Suwon-si (KR); Yewon Park, Suwon-si (KR); Wonjong Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/551,421

(22) Filed: Dec. 15, 2021

(65) Prior Publication Data

US 2022/0108703 A1   Apr. 7, 2022

Related U.S. Application Data

(63) Continuation of application No. 16/899,854, filed on Jun. 12, 2020, now Pat. No. 11,227,608.

(30) Foreign Application Priority Data

Jan. 23, 2020   (KR) .......................... 10-2020-0009316

(51) Int. Cl.
*G10L 17/18* (2013.01)
*G06F 3/16* (2006.01)
(Continued)

(52) U.S. Cl.
CPC .............. *G10L 17/18* (2013.01); *G06F 3/167* (2013.01); *G06F 40/216* (2020.01); *G06F 40/30* (2020.01);
(Continued)

(58) Field of Classification Search
CPC ......... G10L 17/18; G10L 15/16; G10L 15/22; G10L 17/04; G10L 17/22; G10L 15/1822;
(Continued)

(56) References Cited

U.S. PATENT DOCUMENTS 9,547,471 B2 * 1/2017 Williams ................. G06F 40/35
10,129,402 B1 * 11/2018 Conway ............. H04M 3/42221
(Continued)

FOREIGN PATENT DOCUMENTS

CN       107977183 A     5/2018
CN       108737242 A    11/2018
(Continued)

OTHER PUBLICATIONS

Extended European Search Report dated Sep. 15, 2022 for EP Application No. 20914932.7.
(Continued)

*Primary Examiner* — Edwin S Leland, III
(74) *Attorney, Agent, or Firm* — Nixon & Vanderhye P.C.

(57) ABSTRACT

An electronic device is provided. The electronic device includes a memory storing recording data including a content of a conversation and at least one instruction, and a processor configured, by executing the at least one instruction, to input first data corresponding to a first voice in the content of the conversation into a first neural network model and acquire category information of the first data, and acquire category information of second data corresponding to a second voice in the content of the conversation. The processor is configured to, based on the category information of the first data and the category information of the second data being different, train the first neural network model based on the category information of the second data and the first data.

15 Claims, 7 Drawing Sheets

(51) Int. Cl.

| | | |
|---|---|---|
| *G06F 40/216* | (2020.01) | |
| *G06F 40/30* | (2020.01) | |
| *G06F 40/35* | (2020.01) | |
| *G06N 3/045* | (2023.01) | |
| *G06N 3/08* | (2023.01) | |
| *G10L 15/16* | (2006.01) | |
| *G10L 15/22* | (2006.01) | |
| *G10L 17/04* | (2013.01) | |
| *G10L 17/22* | (2013.01) | |
| *G11B 20/10* | (2006.01) | |
| *G10L 15/18* | (2013.01) | |
| *G10L 15/26* | (2006.01) | |
| *G10L 17/00* | (2013.01) | |

(52) U.S. Cl.
CPC ............. *G06F 40/35* (2020.01); *G06N 3/045* (2023.01); *G06N 3/08* (2013.01); *G10L 15/16* (2013.01); *G10L 15/22* (2013.01); *G10L 17/04* (2013.01); *G10L 17/22* (2013.01); *G11B 20/10* (2013.01); *G10L 15/1822* (2013.01); *G10L 15/26* (2013.01); *G10L 17/00* (2013.01)

(58) Field of Classification Search
CPC ......... G10L 15/26; G10L 17/00; G06F 3/167; G06F 40/216; G06F 40/30; G06F 40/35; G06N 3/045; G06N 3/08; G11B 20/10
USPC ........................................................ 704/232
See application file for complete search history.

(56) References Cited

U.S. PATENT DOCUMENTS

| | | | | |
|---|---|---|---|---|
| 10,380,154 | B2* | 8/2019 | Boxwell | G06N 5/04 |
| 10,503,470 | B2* | 12/2019 | Gelfenbeyn | G10L 15/22 |
| 10,522,167 | B1* | 12/2019 | Ayrapetian | G10L 17/18 |
| 10,553,236 | B1* | 2/2020 | Ayrapetian | H04B 17/26 |
| 10,575,197 | B1* | 2/2020 | Briggs | H04W 24/04 |
| 10,733,538 | B2* | 8/2020 | Singaraju | G06F 16/90332 |
| 10,755,728 | B1* | 8/2020 | Ayrapetian | G10L 21/0272 |
| 10,783,561 | B2* | 9/2020 | He | G06N 3/045 |
| 11,050,683 | B2 | 6/2021 | Ban et al. | |
| 11,069,342 | B2* | 7/2021 | Sun | G10L 15/02 |
| 11,189,278 | B2 | 11/2021 | Oh et al. | |
| 11,227,608 | B2* | 1/2022 | Kim | G10L 17/18 |
| 2004/0199482 | A1* | 10/2004 | Wilson | G16H 50/20 |
| | | | | 706/924 |
| 2008/0082332 | A1* | 4/2008 | Mallett | G10L 17/00 |
| | | | | 704/E15.047 |
| 2009/0163183 | A1* | 6/2009 | O'Donoghue | H04M 7/0024 |
| | | | | 455/414.1 |
| 2011/0051907 | A1* | 3/2011 | Jaiswal | G10L 17/22 |
| | | | | 379/88.04 |
| 2012/0203541 | A1* | 8/2012 | Liu | G06F 3/0236 |
| | | | | 704/8 |
| 2014/0122075 | A1* | 5/2014 | Bak | G10L 15/30 |
| | | | | 704/246 |
| 2014/0272821 | A1* | 9/2014 | Pitschel | G06F 40/58 |
| | | | | 434/157 |
| 2016/0140958 | A1 | 5/2016 | Heo et al. | |
| 2017/0109582 | A1* | 4/2017 | Kuznetsova | G06V 10/255 |
| 2018/0061394 | A1 | 3/2018 | Kim et al. | |
| 2019/0074013 | A1* | 3/2019 | Lawrence | G06F 3/167 |
| 2019/0260694 | A1 | 8/2019 | Londhe et al. | |
| 2019/0341031 | A1* | 11/2019 | Cox | G10L 15/22 |
| 2020/0004821 | A1* | 1/2020 | Chatterjee | G06N 3/042 |
| 2020/0090642 | A1* | 3/2020 | Lee | G10L 15/16 |
| 2020/0090682 | A1* | 3/2020 | Liu | G06N 3/08 |
| 2020/0097820 | A1* | 3/2020 | Song | G06N 3/08 |
| 2020/0126584 | A1* | 4/2020 | Huang | G10L 15/144 |
| 2020/0135211 | A1* | 4/2020 | Doi | G10L 17/04 |
| 2020/0152186 | A1* | 5/2020 | Koh | G10L 15/08 |
| 2020/0250265 | A1* | 8/2020 | Yang | G06F 40/56 |
| 2020/0257975 | A1* | 8/2020 | Chang | G06N 3/04 |
| 2021/0233540 | A1* | 7/2021 | Kim | G06F 40/35 |
| 2022/0108703 | A1* | 4/2022 | Kim | G06N 3/08 |

FOREIGN PATENT DOCUMENTS

| | | |
|---|---|---|
| CN | 110287297 A | 9/2019 |
| KR | 10-2014-0054643 | 5/2014 |
| KR | 10-2016-0060247 A | 5/2016 |
| KR | 10-1803081 B1 | 11/2017 |
| KR | 10-1872863 | 7/2018 |
| KR | 10-2018-0125905 A | 11/2018 |
| KR | 10-2019-0055425 A | 5/2019 |
| KR | 10-2019-0062848 | 6/2019 |
| KR | 10-2019-0076712 A | 7/2019 |
| KR | 10-2019-0109614 A | 9/2019 |
| KR | 10-2019-0117837 A | 10/2019 |
| KR | 10-2019-0125154 A | 11/2019 |
| WO | 2005/109334 | 11/2005 |
| WO | WO-2018212584 A2 * | 11/2018 ............ G06F 16/00 |

OTHER PUBLICATIONS

U.S. Appl. No. 16/899,854, filed Jun. 12, 2020; Kim et al.
Bed smell coming from air conditioner, Jun. 25, 2018, https://www.samsungsvc.co.kr/online/movGuideView.do?domainId=NODE0000033866&srChk=Y&bdKd=&bdSeq=&cenId=&method=&qnaId=&gaqId=KNOW1000029808&node_Id=NODE0000125157&page=&pageNo=&stModelName=&svcPrdCode=&svcPrd3Code=&svcPrd2Name=&svcPrd3Name=&searchTarget=DOWNLOAD&dlpage=downMain&kb_Id=&coreword1=%B0%A1%C0%FC&coreword2=%BF%A1%BE%EE%C4%C1&stModelBusinessName=, 4 pages.
Air conditioner is not blowing cool air, May 28, 2013, https://www.samsungsvc.co.kr/online/diagnosisgoVw.do?kb_Id=KNOW1000029648 , 15 pages.
International Search Report and Written Opinion issued Oct. 23, 2020 in corresponding International Application No. PCT/KR2020/006718.
Korean Office Action dated Apr. 12, 2024 for KR Application No. 10-2020-0009316.
European Examination Report dated Apr. 24, 2024 for EP Application No. 20914932.7.
Chinese Office Action dated Nov. 25, 2024 for CN Application No. 202080085442.4.
Korean Notice of Allowance dated Sep. 30, 2024 for KR Application No. 10-2020-0009316.
Rana; "EagleBot: A Chatbot Based Multi-Tier Question Answering System for Retrieving Answers From Heterogeneous Sources Using BERT"; Summer 2019; Electronic Thesis and Dissertations.
(Research on Trajectory Planning and Task Decision of Intelligent Excavator); Mar. 18, 2019.
Kuksenok et al., "Evaluation and Improvement of Chatbot Text Classification Data Quality Using Plausing Negative Examples"; Jun. 5, 2019; 9 pages.

* cited by examiner

ELECTRONIC DEVICE AND CONTROL METHOD THEREOF

CROSS-REFERENCE TO RELATED APPLICATION

This application is a Continuation of U.S. application Ser. No. 16/899,854, filed Jun. 12, 2020, which claims priority to KR 10-2020-0009316, filed Jan. 23, 2020, the entire contents of which are all hereby incorporated herein by reference in their entireties.

BACKGROUND

1. Field

The disclosure relates to an electronic device which identifies a category for a voice of a customer, and a control method thereof.

2. Description of Related Art

Recently, with the development of the robot industry, technologies for a service robot to counsel and respond to customers are developing.

For example, a chatbot at a call center is providing responses to inquiries of customers in place of human counselors.

In the past, for training such a chatbot, an administrator needed to find a case wherein a chatbot misrecognized a customer's inquiry and extract learning data by himself, and update the chatbot.

In this case, there was a problem that a very large amount of an administrator's effort and time was needed for training and maintaining a chatbot.

SUMMARY

Embodiments of the disclosure address the aforementioned need and provide an electronic device which automatically trains an artificial intelligence model included in a chatbot using voice data including a content of a conversation between a customer and a counselor, and a control method thereof.

An electronic device according to an example embodiment of the disclosure includes: a memory storing recording data including a content of a conversation and at least one instruction, and a processor configured, by executing the at least one instruction, to: input first data corresponding to a first voice in the content of the conversation into a first neural network model and acquire the category information of the first data; and acquire the category information of second data corresponding to a second voice in the content of the conversation. The processor may, based on the category information of the first data and the category information of the second data being different, train the first neural network model based on the category information of the second data and the first data.

A control method of an electronic device storing recording data including a content of a conversation according to an example embodiment of the disclosure includes: inputting first data corresponding to a first voice in the content of the conversation into a first neural network model and acquiring the category information of the first data, acquiring the category information of second data corresponding to a second voice in the content of the conversation, and based on the category information of the first data and the category information of the second data being different, training the first neural network model based on the category information of the second data and the first data.

BRIEF DESCRIPTION OF THE DRAWINGS

The above and other aspects, features and advantages of certain embodiments of the present disclosure will be apparent from the following detailed description, taken in conjunction with the accompanying drawings, in which.

DETAILED DESCRIPTION

Figure 1:
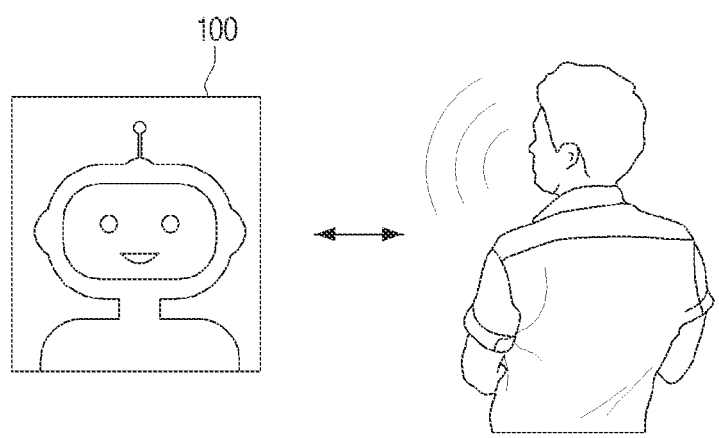
FIG. 1 is a diagram illustrating an example electronic device in place of a counselor according to an embodiment of the disclosure.

Example embodiments of the disclosure address the aforementioned need, and provide an electronic device which automatically trains an artificial intelligence model included in a chatbot using voice data including a content of a conversation between a customer and a counselor, and a control method thereof.

Hereinafter, the disclosure will be described in greater detail with reference to the accompanying drawings.

Terms used in disclosure will be described briefly, and then the disclosure will be described in greater detail.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies. Also, in some cases, there may be terms that may be arbitrarily selected, and in such cases, the meaning of the terms will be described in the relevant descriptions in the disclosure. Thus, the terms used in the disclosure should be defined based on the meaning of the terms and the overall content of the disclosure, not just based on the names of the terms.

Various modifications may be made to the various embodiments of the disclosure, and there may be various types of embodiments. Accordingly, various embodiments will be illustrated in drawings, and the embodiments will be described in greater detail in the detailed description. However, it should be noted that the various example embodiments are not intended to limit the scope of the disclosure to a specific embodiment, but they should be understood to include all modifications, equivalents or alternatives of the embodiments included in the ideas and the technical scope disclosed herein. In case it is determined that in describing embodiments, detailed explanation of related known technologies may unnecessarily confuse or obscure the gist of the disclosure, the detailed explanation may be omitted.

Singular expressions include plural expressions as long as they do not conflict with the context. In the disclosure, terms such as "include" and "consist of" should be understood as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

The expression "at least one of A and/or B" should be interpreted to include any one of "A" or "B" or "A and B."

The expressions "first," "second" and the like used in this disclosure may be used to describe various elements regardless of any order and/or degree of importance. In addition, such expressions are used only to distinguish one element from another element, and are not intended to limit the elements.

The description in the disclosure that one element (e.g. a first element) is "(operatively or communicatively) coupled with/to" or "connected to" another element (e.g: a second element) should be understood to include both the case where the one element is directly coupled to the another element, and the case where the one element is coupled to the another element through still another element (e.g., a third element).

In the disclosure, "a module" or "a part" performs at least one function or operation, and may be implemented as hardware or software, or as a combination of hardware and software. Further, a plurality of "modules" or "parts" may be integrated into at least one module and implemented as at least one processor (not shown), except "modules" or "parts" which need to be implemented as specific hardware. In addition, in this specification, the term "user" may refer to a person who uses a terminal device or a device using a terminal device (e.g.: an artificial intelligence electronic device).

Hereinafter, various example embodiments of the disclosure will be described in greater detail with reference to the accompanying drawings. However, it should be noted that the disclosure may be implemented in various different forms, and is not limited to the embodiments described herein. In the drawings, parts that are not related to explanation may be omitted, for explaining the disclosure clearly, and throughout the disclosure, similar components are designated using similar reference numerals.

Hereinafter, example embodiments of the disclosure will be described in greater detail with reference to the accompanying drawings.

FIG. 1 is a diagram illustrating an example electronic device in place of a counselor according to an embodiment of the disclosure.

An electronic device 100 may be a device which understands a user voice transmitted from a terminal device, etc., and provides a response. For example, the electronic device 100 may be implemented, for example, and without limitation, as a chatbot, a smartphone, a server, etc. A chatbot may, for example, include a device which understands a user voice and provides a response, and may, for example, include a device simulating humans, and it may, for example, be a chatbot in place of a counselor at a call center. Where the electronic device 100 is implemented as a chatbot, the electronic device 100 may, for example, and without limitation, provide response information in the form of a voice or response information in the form of a visual UI corresponding to the content of a customer's inquiry to a terminal device through a chatbot.

As described above, according to various example embodiments of the disclosure, as a process wherein a chatbot is trained may be automated. Accordingly, the cost spent for training and maintaining a chatbot may be reduced and time spent may also be shortened.

As a chatbot is trained while a voice of a customer and a voice of a counselor are distinguished in voice data including the content of a conversation between the customer and the counselor, the accuracy of the chatbot in understanding the content of the customer's inquiry is improved. In addition, as a process of determining whether a voice of a counselor is a distinguished response or a combined response is included, the accuracy of category information for the content of the response may be improved. Accordingly, the accuracy of a chatbot in understanding the content of a customer's inquiry may be improved.

It is important for the electronic device 100 to identify the content of an inquiry accurately to provide an appropriate response to the content of a customer's inquiry. A method for the electronic device 100 to train a neural network model used to identify the content of an inquiry will be described in greater detail below with reference to the drawings according to the various example embodiments of the disclosure.

Figure 2:
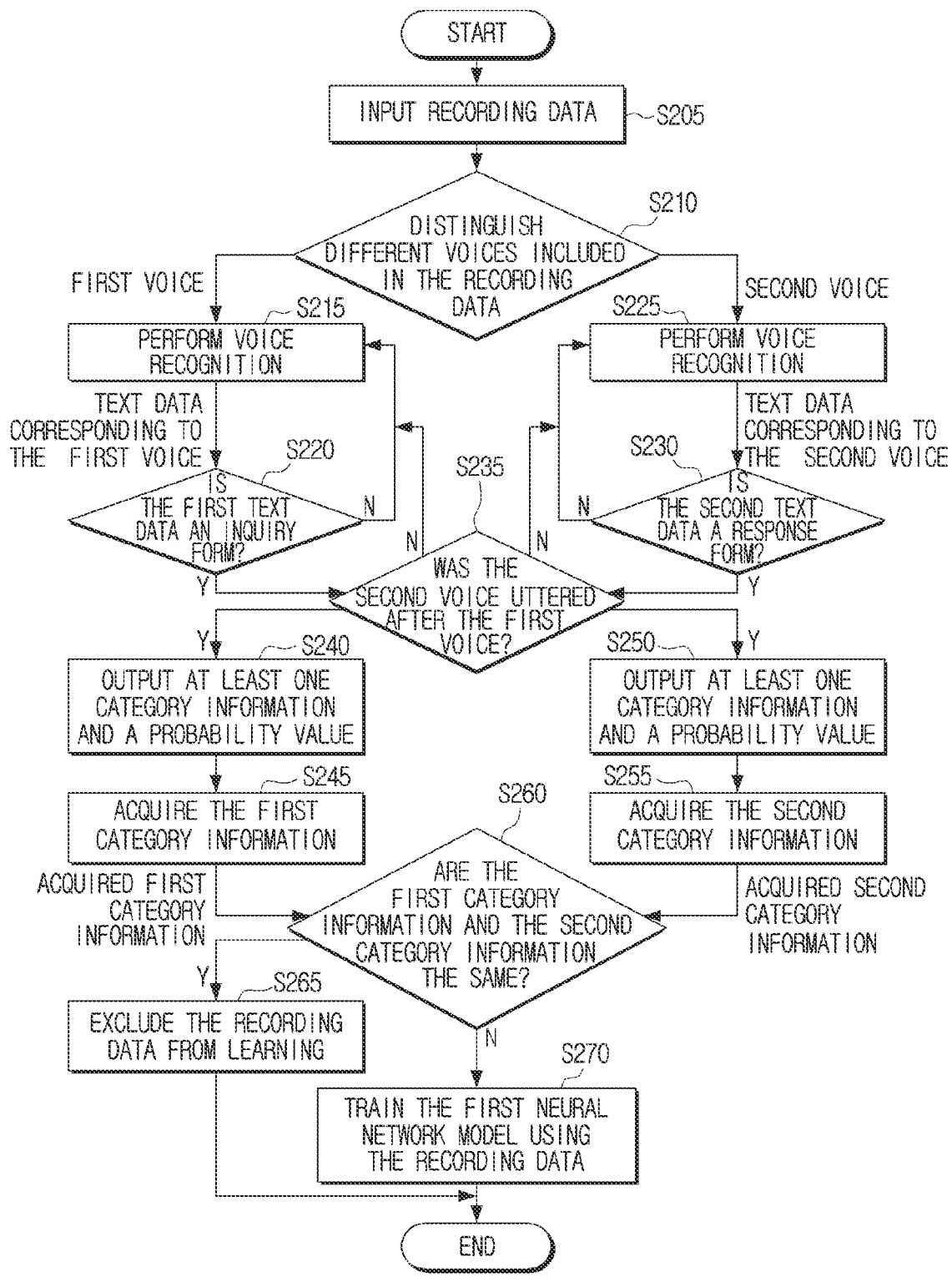
FIG. 2 is a flowchart illustrating example training of a neural network model according to an embodiment of the disclosure.

FIG. 2 is a flowchart illustrating example training of a neural network model according to an embodiment of the disclosure.

Training of a neural network model classifying the category of the content of an inquiry according to an embodiment of the disclosure may be performed at the electronic device 100.

Referring to FIG. 2, voice data (e.g., recording data) may be input into the electronic device 100 at operation S205. Voice data may include, for example, recording data including the content of a conversation. For example, recording data may be recording data including the content of a conversation between a customer and a counselor, and may include the voice of the customer and the voice of the counselor. As an example, the voice of a customer included in recording data may include, for example, an inquiry content, and the voice of a counselor may include, for example, a response content.

According to an embodiment of the disclosure, recording data may include, for example, data including all the content of the conversation during one call between a customer and a counselor. However, the disclosure is not limited thereto, and recording data may be data including an inquiry content of a customer and a response content corresponding thereto. The electronic device 100 may identify an inquiry form in a customer's voice or text data corresponding to a customer's voice, and identify a response form in a counselor's voice or text data corresponding to a counselor's voice. An inquiry form may include, for example, and without limitation, not only a general interrogative form but also various cases of requesting a response to the counterparty, and a response form may include, for example, and without limitation, not only a general declarative form but also various cases of providing information. In other words, recording data may be data edited such that a voice in an inquiry form of a customer and a voice in a response form of a counselor are included. Accordingly, information on greetings, customer information, etc. that are unnecessary for training a neural network model classifying the category of an inquiry content may be excluded from recording data. However, hereinafter, for ease and convenience of explanation, recording data will be assumed as data including all the content of the conversation during one call between a customer and a counselor.

Recording data may be data wherein the content of a conversation between a customer and a counselor was recorded previously, or data wherein the content of a conversation between a customer and a counselor is recorded in real time.

Recording data may be input from an external device (e.g., an external server, an external database, etc.). The electronic device 100 may distinguish different voices included in the input recording data. In other words, the electronic device 100 may distinguish a first voice and a second voice included in the input recording data at operation S210. For example, the first voice may correspond to a customer's voice, and the second voice may correspond to a counselor's voice. Hereinafter, explanation will be made based on an example wherein the first voice is a customer's voice, and the second voice is a counselor's voice, for the convenience and ease of explanation.

According to an embodiment of the disclosure, the electronic device 100 may identify the second voice in recording data based on pre-stored voice profile information related to the second voice. For example, voice profile information may include, for example, and without limitation, waveform information regarding a counselor's voice, voice identification information including a counselor's name and the like, etc.

For example, the electronic device 100 may compare the frequency waveform information of a voice included in voice profile information and the frequency waveform information of a voice included in recording data and identify the second voice in the recording data. The electronic device 100 may identify the remaining voice different from the second voice among the voices included in the recording data as the first voice which may, for example, be a customer's voice. However, the disclosure is not limited thereto, and the second voice which is a counselor's voice may be identified based on the content of the voice. For example, a voice corresponding to a content inducing an inquiry such as "What can I help you with?" or a content identifying personal information may be identified as the second voice which is a counselor's voice. Information for a content for identifying the second voice as above may be stored in the electronic device 100 in advance, or received from the outside. If at least some of the second voice is identified based on the content of the recording data, the electronic device 100 may acquire voice profile information corresponding to a counselor's voice based on the characteristic information of the identified second voice.

The electronic device 100 may perform voice recognition for the first voice and acquire text data corresponding to the first voice (hereinafter, the first text data) at operation S215. For example, the electronic device 100 may perform voice recognition for the first voice using a neural network model for voice recognition. However, the disclosure is not limited thereto, and voice recognition for the first voice may be performed at an external device, an external server, etc., and the electronic device 100 may receive the first text data corresponding to the first voice from the outside.

The electronic device 100 may identify whether the first text data is an inquiry form at operation S220. An inquiry form may, for example, include not only a general interrogative form but also various cases of requesting a response to the counterparty. Where the first text data is not an inquiry form at operation S220-N, the electronic device 100 may perform voice recognition for another first voice.

In addition, the electronic device 100 may perform voice recognition for the second voice and acquire text data corresponding to the second voice (hereinafter, the second text data) at operation S225. Voice recognition for the second voice may be performed in a manner which is the same as/similar to the voice recognition for the first voice.

The electronic device 100 may identify whether the second text data is a response form at operation S230. A response form may include, for example, not only a general declarative form but also various cases of providing information. In case the second text data is not a response form at operation S230-N, the electronic device 100 may perform voice recognition for another second voice.

Where the first text data is an inquiry form at operation S220-Y, and the second text data is a response form at operation S230-Y, the electronic device 100 may identify whether the second voice corresponding to the second text data was uttered after the first voice corresponding to the first text data at operation S235. This is because the second voice of the counselor uttered after the first voice which is the inquiry of the customer may be a response corresponding to the inquiry of the customer. Detailed explanation in this regard will be made below with reference to FIG. 4.

Where the second voice was not uttered after the first voice at operation S235-N, in other words, in case the second voice was uttered before the first voice, the electronic device 100 may identify that the first text data and the second text data are not matched. Accordingly, the electronic device 100 may perform voice recognition for the first voice and the second voice different from the previous one so that the matched first text data and second text data are identified.

IF it is identified that the second voice corresponding to the second text data was uttered after the first voice corresponding to the first text data at operation S235-Y, the electronic device 100 may input the first text data into the first neural network model. When the first text data is input into the first neural network model, the first neural network model may output at least one category information and a probability value of the first text data at operation S240. A probability value may be a probability value for the accuracy of the data of the first voice being classified as the category information. According to an embodiment of the disclosure, the first neural network model may be trained using the text data corresponding to the first voice and the category information of the text data as a pair of input and output data. For example, the first neural network model may be trained to output probability information corresponding to each of a plurality of pre-defined categories if the first text data corresponding to the first voice is input.

For example, based on the first text data corresponding to the first voice "The air-conditioning is weak," the first neural network model may output the category information and the probability value of the first text data corresponding to the first voice as "breakdown of air-conditioning (category ID: 2000), probability value 0.9," "window opened (category ID: 1010), probability value 0.1," etc.

In this example, the electronic device 100 may acquire the category information (the first category information) of the data corresponding to the first voice based on the highest probability value at operation S245. For example, the electronic device 100 may acquire "breakdown of air-conditioning (category ID: 2000)."

Category information may include, for example, information classified based on frequently asked questions (FAQ), and a range having the same characteristic may be classified as one category information. Characteristics may include the type, the function, etc. of a device. Category information may be classified according to a predetermined depth. For example, in a wide range, problems related to an air conditioner may be classified as the same category information, and in a narrow range, different functions of an air conditioner may be classified as separate category information. Such category information may be different for each business operator.

If it is identified that the second voice corresponding to the second text data was uttered after the first voice corresponding to the first text data at operation S235-Y, the electronic device 100 may input the second text data into the second neural network model.

When the second text data is input into the second neural network model, the second neural network model may output at least one category information and a probability value of the second text data at operation S250. According to an embodiment of the disclosure, the second neural network model may be trained using the text data corresponding to the second voice and the category information of the text data as a pair of input and output data. For example, the second neural network model may be trained to output probability information corresponding to each of a plurality of pre-defined categories if the second text data corresponding to the second voice is input.

For example, based on the data corresponding to the second voice "Select the desired temperature as the lowest," the second neural network model may output the category information and the probability value of the data corresponding to the second voice as "breakdown of air-conditioning (category ID: 2000), probability value 0.9," "window opened (category ID: 1010), probability value 0.1," etc.

In this example, the electronic device 100 may acquire the category information (the second category information) of the data corresponding to the second voice based on the highest probability value at operation S255. For example, the electronic device 100 may acquire "breakdown of air-conditioning (category ID: 2000)." The operation S255 of acquiring the category information of the data corresponding to the second voice will be described in detail below with reference to FIG. 3.

Hereinafter, for the convenience of explanation, the category information of the data corresponding to the first voice may be referred to as the first category information, and the category information of the data corresponding to the second voice may be referred to as the second category information.

The electronic device 100 may compare the first category information and the second category information output from the first neural network model and the second neural network model at operation S260. The input data of the first neural network model is the first text data corresponding to the first voice, and the input data of the second neural network model is the second text data corresponding to the second voice, and thus the category information output from the first neural network model and the second neural network model may be separate independent information.

Where the first category information and the second category information are the same at operation S260-Y, the first neural network model identifies that the correct category information corresponding to the recording data was output, and thus there is no need to use the recording data as the learning data of the first neural network model. Accordingly, the electronic device 100 may exclude the recording data from training of the first neural network model at operation S265.

However, where the first category information and the second category information are different at operation S260-N, the first neural network model determines that appropriate training based on the recording data was not performed, and the recording data may be used in training of the first neural network model at operation S270.

The electronic device 100 may train the first neural network model based on the first text data corresponding to the first voice and the second category information. In other words, based on the premise that training of the second neural network model has already been performed well and the second neural network model outputs more accurate category information than the first neural network model, the electronic device 100 may determine that the accuracy of the second category information is relatively high compared to the first category information output from the first neural network model, and train the first neural network model using the first text data corresponding to the first voice and the second category information respectively as input data and output data. For example, a case wherein the recording data includes an inquiry content "Cold wind is suddenly not coming out of the air conditioner" and a response content "Select the desired temperature as the lowest" will be assumed. In this case, the data corresponding to the first voice may be "Cold wind is suddenly not coming out of the air conditioner" and the data corresponding to the second voice may be "Select the desired temperature as the lowest."

In the example above, it is assumed that text data corresponding to the first voice "Cold wind is suddenly not coming out of the air conditioner" was input into the first neural network model and category information which is "the problem of the fan of the air conditioner (category ID: 2050)" was acquired, and text data corresponding to the first voice "Select the desired temperature as the lowest" was input into the second neural network model and category information which is "breakdown of air-conditioning (category ID: 2000)" was acquired. A case as above may fall under a case wherein the first category information regarding an inquiry content and the second category information regarding a response content are different. In this case, it is assumed that the second neural network model was trained in advance to classify the category of a response content well, and outputs category information having high credibility for a response content included in the recording data. Also, in case the category information acquired from the first neural network model and the category information acquired from the second neural network model are different, the first neural network model may be trained based on the second category information.

In other words, the electronic device 100 may train the first neural network model based on the data corresponding to the first voice and the second category information, and afterwards, in case the voice "Cold wind is suddenly not coming out of the air conditioner" is included in the first voice, the first neural network model may output category information corresponding to "breakdown of air-conditioning (category ID: 2000)" but not category information corresponding to "the problem of the fan of the air conditioner (category ID: 2050)." Accordingly, not only in a case wherein a customer makes an inquiry that "The air-conditioning has a problem" which is an inquiry directly mentioning a keyword corresponding to "the problem of air-conditioning (category ID: 2000)" but also in a case wherein a customer makes an inquiry that "Cold wind is suddenly not coming out of the air conditioner," the first neural network model may be trained such that the inquiry is classified as "the problem of air-conditioning (category ID: 2000)." Thus, with respect to an inquiry that "Cold wind is suddenly not coming out of the air conditioner," a response corresponding to "the problem of air-conditioning (category ID: 2000)" can be provided.

Each of the aforementioned first neural network model and second neural network model may include a plurality of neural network layers. Each of the plurality of neural network layers may have a plurality of weight values, and may perform a neural network operation through an operation between the operation result of the previous layer and the plurality of weight values. The plurality of weight values that the plurality of neural network layers have may be optimized and/or improved by a learning result of a neural network model. For example, the plurality of weight values may be updated such that a loss value or a cost value acquired from a neural network model during a learning process is reduced or minimized. An artificial neural network may include, for example, and without limitation, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, etc., but the disclosure is not limited to the aforementioned examples.

The output portions of the first neural network model and the second neural network model may be implemented such that softmax processing is possible. The softmax is a function that normalizes all input values to values between 0 and 1, and always makes the sum of the output values as 1, and may perform the function of outputting probability values for each class. The output portions of the first neural network model and the second neural network model may be implemented such that argmax processing is possible. The argmax is a function that selects a label having the highest possibility among a plurality of labels, and here, it may perform the function of selecting a ratio having the biggest value among the probability values for each class. For example, in case argmax processing has been performed on the output portions of each of the first neural network model and the second neural network model, only one category information having the highest probability value can be output.

The first neural network model and the second neural network model may have been trained by the electronic device 100 or a separate server/system through various learning algorithms. A learning algorithm may include, for example, a method of training a specific subject device using a plurality of learning data and thereby enabling the specific subject device to make a decision or a prediction by itself. Examples of learning algorithms, include, for example, and without limitation, supervised learning, unsupervised learning, semi-supervised learning, reinforcement learning, or the like, and the learning algorithms in the disclosure are not limited to the aforementioned examples excluding specified cases.

After the first neural network model is trained sufficiently through the aforementioned examples, the first neural network model may be used for a chatbot function, as an example. For example, a device performing a chatbot function may identify category information corresponding to a customer's inquiry content through the first neural network model, and acquire a response content corresponding to the identified category information from a memory and provide the response content. In this case, in the memory, samples of response contents corresponding to each category information may have been stored in advance.

As described above, the first neural network model trained according to an embodiment of the disclosure may be used while being included in a chatbot function, but the second neural network model may not be used for a chatbot function. Hereinafter, a method of acquiring the second category information using the second neural network model will be described in greater detail below with reference to FIG. 3.

Figure 3:
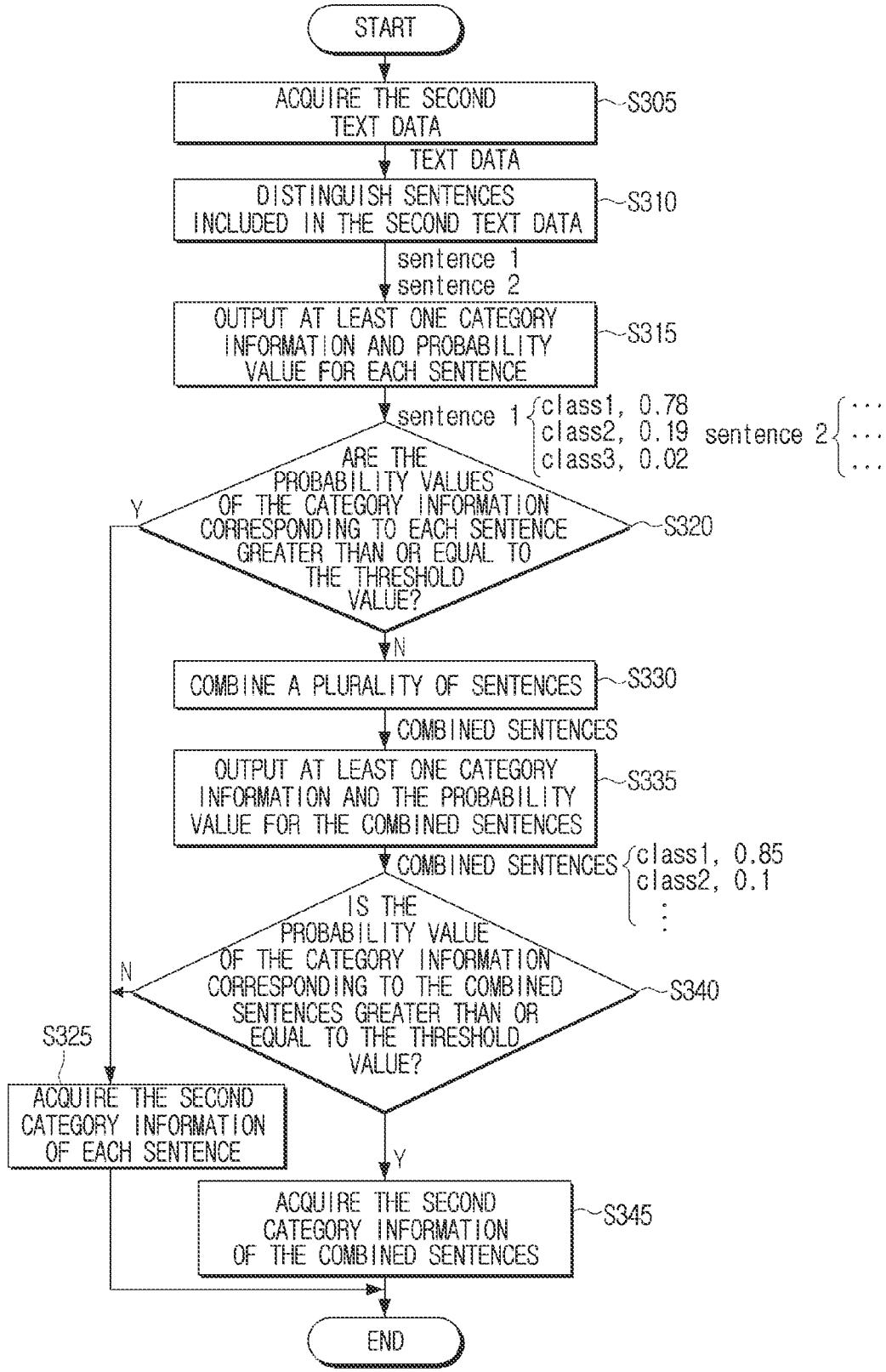
FIG. 3 is a flowchart illustrating an example process of acquiring the second category information according to an embodiment of the disclosure.

FIG. 3 is a flowchart illustrating an example process of acquiring the second category information according to an embodiment of the disclosure.

FIG. 3 is a flowchart illustrating operation S255 of acquiring the second category information in FIG. 2.

As described above, various embodiments of the disclosure are based on the premise that the response content included in the second text data corresponding to the second voice (e.g., a counselor's voice) is a correct answer to the inquiry content and the premise that the second category information for the second voice is also information having high accuracy compared to the first category information. While forms of making inquiries, expressions for making inquiries, etc. are diverse for each customer, response contents of a counselor are provided according to predetermined manual data, and accordingly, the diversity of forms of response contents or expressions for response contents is relatively small compared to inquiries, and thus it can be assumed that the second category information is information having high accuracy compared to the first category information. In other words, the first neural network model is trained based on the second category information, and thus it is important to acquire accurate second category information. The second category information may be acquired through various operations.

When the second text data corresponding to the second voice is acquired at operation S305, the electronic device 100 may distinguish sentences included in the second text data at operation S310. A sentence may refer, for example, to a minimum unit expressing a completed content. However, the disclosure is not limited thereto, and it is apparent that the second text data can be divided by various standards, such as being divided based on intentions. Hereinafter, for convenience of explanation, it will be described that the second text data is divided based on sentences.

The electronic device 100 may sequentially input text data corresponding to each of a plurality of sentences included in the second text data corresponding to the second voice into the second neural network model.

When each of the divided sentences is input into the second neural network model, the second neural network model may output the category information for each sentence and probability values corresponding to the category information at operation S315.

For example, an example in which "Please ventilate" and "Please turn on the air blast" are included in the second text data is assumed. The electronic device 100 may input each of "Please ventilate" and "Please turn on the air blast" included in the second text data into the second neural network model and acquire the category information and the probability values for each of them. For example, the category information and the probability values of the sentence "Please ventilate" may be classified as "the problem of gas leakage (category ID: 3000), probability value 0.78," "the problem of the smell of the air-conditioner, probability value 0.19," etc. In this case, the electronic device 100 may acquire the category information of the sentence "Please ventilate" as "the problem of gas leakage (category ID: 3000)" based on the highest probability value.

As described above, based on the acquired category information and probability values of each sentence, the electronic device 100 may identify whether the probability values of the category information corresponding to each sentence are greater than or equal to a threshold value at operation S320. If each of the acquired probability values are greater than or equal to a threshold value at operation S320-Y, the electronic device 100 may acquire each of the acquired category information as the second category information of each corresponding sentence at operation S325. In other words, the electronic device 100 may identify the acquired category information as the second category information.

As an example, a case wherein the threshold value is 0.7, and "Please ventilate" is classified as the category information for "the problem of gas leakage" and the probability value is 0.78, and "Please turn on the air blast" is classified as the category information for "the problem of the fan of the air conditioner" and the probability value is 0.9 is assumed. In this case, as all of the probability values of each sentence are greater than or equal to the threshold value, the electronic device 100 may identify "Please ventilate" as the category information for "the problem of gas leakage (category ID: 3000)" and "Please turn on the air blast" as the category information for "the problem of the fan of the air conditioner (category ID: 2050)," and identify them as category information different from each other.

IF the acquired probability values of the category information corresponding to each sentence are smaller than the threshold value at operation S320-N, the electronic device 100 may combine at least some of the plurality of sentences at operation S330, and input the combined sentences into the second neural network model.

For example, a case wherein "Please ventilate" included in the second text data is classified as the category information for "the problem of the smell of the air conditioner" and the probability value is 0.5, and "Please turn on the air blast" is also classified as the category information for "the problem of the smell of the air conditioner" and the probability value is 0.65 is assumed. In this case, as all of the probability values of each sentence are smaller than the threshold value, the electronic device 100 may combine the sentences like "Please ventilate. Please turn on the air blast," and input the combined sentences into the second neural network model.

The second neural network model may output the category information and the probability value corresponding to the combined sentences at operation S335.

The electronic device 100 may identify whether the probability value of the category information corresponding to the combined sentences is greater than or equal to the threshold value at operation S340. If the probability value for the combined sentences is greater than or equal to the threshold value, the electronic device 100 may acquire the acquired category information as the second category information of the combined sentences at operation S345. In other words, the electronic device 100 may identify the acquired category information as the second category information. If the probability value for the combined sentences is smaller than the threshold value, the electronic device 100 may acquire each of the acquired category information as the second category information of each corresponding sentence at operation S325.

For example, a case wherein the combined sentences "Please ventilate. Please turn on the air blast" are classified as the category information for "the problem of the smell of the air conditioner (category ID: 1500)" and the probability value is 0.85 is assumed. In this case, as the probability value for the combined sentences is greater than the threshold value (e.g., 0.7), the electronic device 100 may identify the acquired category information (the problem of the smell of the air conditioner (category ID: 1500)) as the second category information. In other words, "Please ventilate. Please turn on the air blast" is a combination of each sentence and may be identified as one response content corresponding to one inquiry content.

According to an embodiment of the disclosure, the electronic device 100 may combine only the sentences of which category information acquired at the operation S325 is the same, and input the combined sentences into the second neural network model and acquire a probability value. For example, in case the category information of the sentence "Please ventilate" is classified as "the problem of gas leakage (category ID: 3000)," and the category information of the sentence "Please turn on the air blast" is classified as "the problem of the fan of the air conditioner (category ID: 2050)" and each sentence has different category information from each other, the sentences may not become a subject for combination. As described above, even in a case wherein the category information of different sentences is the same but the probability values of the category information of each sentence are smaller than the threshold value and the text data is excluded from learning, if the probability value of the category information of a sentence which combined the sentences is greater than or equal to the threshold value, the category information may be used in learning of the first neural network model using the first category related to the category information for the combined sentences.

However, depending on cases, even in case the category information for each sentence is different, the sentences may be combined, and in case the probability value of the category information of the combined sentences is greater than the probability values of the category information of each sentence before combination, the electronic device 100 may use the category information in learning of the first neural network model using the first category related to the category information for the combined sentences.

In case a connective word is included in a sentence acquired by combining at least some of each of a plurality of sentences, the electronic device 100 may apply a weight value to the probability value of the category information corresponding to the acquired sentence based on at least one of the type or the number of times of the connective word. A connective word may, for example, be a word playing the role of connecting each sentence naturally, and for example, a connective word may be expressed as a conjunctive word. In the types of connective words, causal connective words such as "accordingly, thus," and adversative connective words such as "nevertheless, however" may be included. In other words, a connective word indicates that two sentences are associated with each other, and thus, in case two sentences are combined, it is desirable that the electronic device 100 adds a weight value to the probability value for the category information corresponding to the two sentences.

Depending on cases, in case a plurality of sentences connected by a connective word is included in the second text data, the electronic device 100 may not acquire the category information and the probability values of each sentence, but may directly acquire the category information and the probability value for a plurality of sentences connected by a connective word, i.e., combined sentences.

Based on the feedback information of the customer for the response information, the electronic device 100 may determine whether to train the first neural network model using the first voice or the text data associated with the response information as learning data. For example, in case the first voice or the second voice matched with the first text data or the second category information of the second text data is output through the second neural network model and response information according to the second category information was provided, but there was a negative feedback by the customer for the response information, the electronic device 100 may identify that the second category information does not correspond to the first voice or the first text data and may not train the first neural network model based on the first voice or the first text data, and the second category information. In other words, the electronic device 100 may determine learning data for training the first neural network model based on the feedback information of the customer.

Figure 4:
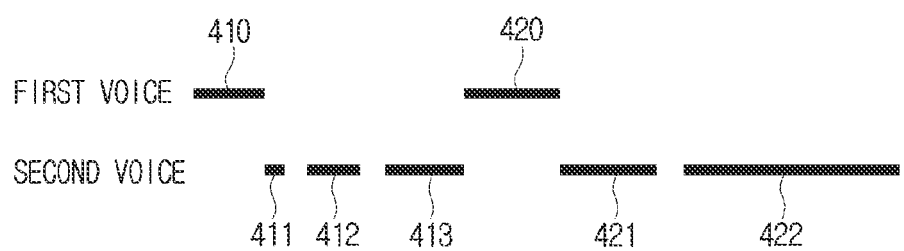
FIG. 4 is a diagram illustrating an example of corresponding relation between a first voice and a second voice according to an embodiment of the disclosure.

FIG. 4 is a diagram illustrating an example corresponding relation between a first voice and a second voice according to an embodiment of the disclosure.

As described above, according to the various embodiments of the disclosure, the electronic device 100 may train the first neural network model by comparing the first category information corresponding to the first voice and the second category information corresponding to the second voice. In this case, the first voice of the first category information and the second voice of the second category information should be an inquiry content and a response content matched with each other. In other words, in case the second voice which is the subject of comparison is a voice including response information corresponding to the first voice, the first voice and the text may be used as learning data for training the first neural network model. Hereinafter, an embodiment wherein the electronic device 100 identifies the second voice matched with the first voice will be described.

FIG. 4 is a diagram wherein the first voice and the second voice included in the recording data are indicated while being distinguished from each other. In this regard, a case wherein the voices are indicated according to the passage of time, and are indicated in solid lines during the time when each voice is uttered, and the first voice is filtered as an inquiry form and the second voice is filtered as a response form is assumed.

According to an embodiment of the disclosure, the electronic device 100 may match the first voice and the second voice based on the utterance points of each voice. For example, the electronic device 100 may identify the second voice uttered after the first voice as a candidate group matched with the first voice. This is because the response information of the counselor is uttered after the inquiry of the customer.

According to an embodiment of the disclosure, the electronic device 100 may identify a plurality of second voices 411, 412, 413 uttered between the first first voice 410 and the second first voice 420 in FIG. 4 as voices matched with the first first voice 410. In addition, the electronic device 100 may identify a plurality of second voices 421, 422 uttered after the second first voice 420 in FIG. 4 as voices matched with the second first voice 420. Afterwards, the electronic device 100 may identify whether the plurality of second voices 411, 412, 413 are combined ones having one category information and are one response content, or separate ones having respective category information, as in the operation in FIG. 3.

According to another embodiment of the disclosure, the electronic device 100 may identify whether there is relevance between the utterance points of each voice and each voice, and acquire the first voice and the second voice matched with each other. For example, the electronic device 100 may identify the plurality of second voices 411, 412, 413 uttered between the first first voice 410 and the second first voice 420 in FIG. 4 as a candidate group of the second voices matched with the first first voice 410.

The electronic device 100 may identify whether there is relevance between the first voice 410 and the second voice candidate group 411, 412, 413. As an example, the electronic device 100 may extract a keyword included in the first voice 410 or the first text data corresponding to the first voice, and extract a keyword included in the second voice candidate group 411, 412, 413 or the text data corresponding to the second voice candidate group, and identify whether there is relevance between the two keywords. For example, in case the keyword of the first voice is "smell" and the keyword of at least one of the second voice candidate group is "ventilation," the electronic device 100 may identify "smell" and "ventilation" as relevant keywords, and determine that the first voice and the second voice are matched. Relevance between keywords may be identified through an artificial intelligence model, or identified through an external server. The electronic device 100 may identify whether there is relevance between keywords based on information on the relevance among words stored in the memory.

The electronic device 100 may identify the plurality of second voices 421, 422 uttered after the second first voice 420 as a candidate group of the second voices matched with the second first voice 420. If it is identified that there is no relevance between the second first voice 420 and the second voice candidate group 421, 422, the electronic device 100 may exclude the second first voice 420 and the second voice candidate group 421, 422 from learning data for training the first neural network model.

If it is identified that the second first voice 420 is not an inquiry form, the electronic device 100 may identify the plurality of second voices 411, 412, 413, 421, 422 uttered after the first first voice 410 as a candidate group matched with the first first voice 410.

Figure 5:
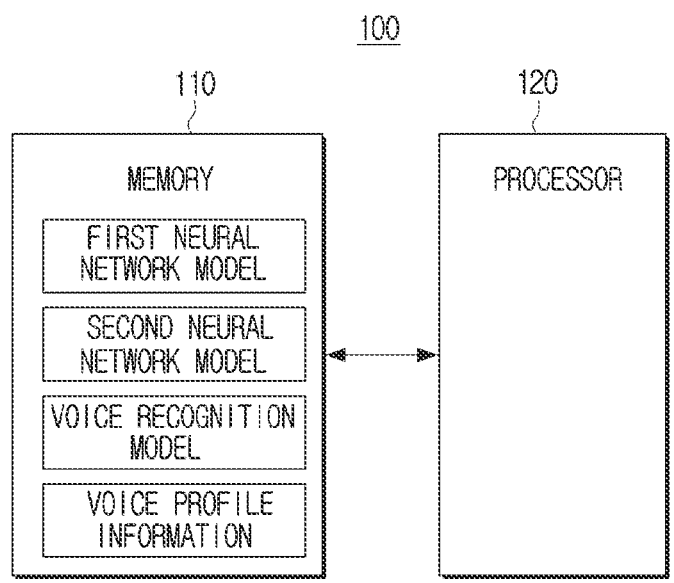
FIG. 5 is a block diagram illustrating an example configuration of an example electronic device according to an embodiment of the disclosure.

FIG. 5 is a block diagram illustrating an example configuration of an example electronic device according to an embodiment of the disclosure.

The electronic device 100 may include a memory 110 and a processor (e.g., including processing circuitry) 120.

The memory 110 may be electronically connected with the processor 120, and store data necessary for the various embodiments of the disclosure.

The memory 110 may be implemented in the form of a memory embedded in the electronic device 100, or in the form of a memory that can be attached to or detached from the electronic device 100, according to the usage of stored data. For example, in the case of data for operating the electronic device 100, the data may be stored in a memory embedded in the electronic device 100, and in the case of data for the extending function of the electronic device 100, the data may be stored in a memory that can be attached to or detached from the electronic device 100. Meanwhile, in the case of a memory embedded in the electronic device 100, the memory may be implemented as at least one of a volatile memory (e.g.: a dynamic RAM (DRAM), a static RAM (SRAM) or a synchronous dynamic RAM (SDRAM), etc.) or a non-volatile memory (e.g.: a one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). In the case of a memory that can be attached to or detached from the electronic device 100, the memory may be implemented in a form such as a memory card (e.g., compact flash (CF), secure digital (SD), micro secure digital (Micro-SD), mini secure digital (Mini-SD), extreme digital (xD), a multimedia card (MMC), etc.) and an external memory that can be connected to a USB port (e.g., a USB memory), etc.

According to an embodiment of the disclosure, the memory 110 may store a first neural network model, a second neural network model, and a voice recognition model.

The first neural network model may be a model that outputs at least one category information and the probability values of the first voice or the first text data corresponding to the first voice, and the second neural network model may be a model that outputs at least one category information and the probability values of the second voice or the second text data corresponding to the second voice. The first neural network model and the second neural network model may output the category information as unknown. Here, the category information is "unknown." The voice recognition model may be a model that recognizes a user voice and outputs the voice as a text, and may be implemented, for example, as an automatic speech recognition (ASR) model. For example, the voice recognition model may output the first voice as the first text data corresponding to the first voice, and output the second voice as the second text data corresponding to the second voice. However, the disclosure is not limited thereto, and in case a voice recognition model is not included in the memory 110, it is possible that voice recognition for the first voice and the second voice is performed at an external device, an external server, etc., and the electronic device 100 receives the first text data and the second text data corresponding to the first voice and the second voice from the outside.

The memory 110 may store voice profile information related to the second voice. Here, the voice profile information may include waveform information regarding a counselor's voice, voice identification information including a counselor's name and the like, etc.

In addition, the memory 110 may include sample information of response contents corresponding to each category information. For example, in case the category information of the first voice is identified through the trained first neural network model, response contents stored in the memory 110 may be provided through the speaker of the terminal device according to control of the processor 120.

The processor 120 may include various processing circuitry and is electronically connected with the memory 110, and controls the overall operations of the electronic device 100. The processor 120 controls the overall operations of the electronic device 100 using various kinds of instructions or programs stored in the memory 110. For example, according to an embodiment of the disclosure, the main CPU may copy a program in the RAM according to an instruction stored in the ROM, and access the RAM and execute the program. Here, a program may include an artificial intelligence model, etc.

The processor 120 may load the first neural network model, the second neural network model, the voice recognition model, etc. stored in the memory 110 to the processor 120. For example, for training the first neural network model, the processor 120 may load the first neural network model stored in the memory 110 outside the processor 120 to the memory (not shown) inside the processor 120. In addition, the processor 120 may load the voice recognition model stored in the memory 110 to the memory inside the processor 120, and access the loaded voice recognition model and perform voice recognition.

Figure 6:
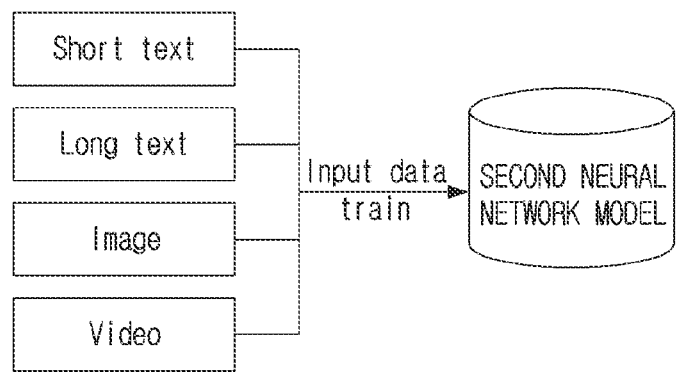
FIG. 6 is a diagram illustrating an example process of training a second neural network model according to an embodiment of the disclosure.

FIG. 6 is a diagram illustrating an example process of training a second neural network model according to an embodiment of the disclosure.

A second neural network model may be a model that outputs at least one category information and the probability values of the second text data. In other words, the second neural network model may be a model that outputs the category information of the text data corresponding to a counselor's voice (the second voice), and thus the second neural network model may be trained based on data associated with the counselor's voice.

For example, the electronic device 100 may train the second neural network model based on a short text, a long text, etc. included in the second text data corresponding to the second voice.

For example, a case wherein the electronic device 100 trains the second neural network model regarding the category information of "the problem of the smell of the air conditioner (category ID: 1500)" is assumed.

As an example, the electronic device 100 may use a short text "Use after ventilation" included in the second text data as input data, and train the second neural network model with the output data in accordance thereto as "the problem of the smell of the air conditioner (category ID: 1500)." The electronic device 100 may use a long text "The air conditioner uses an air circulating method of absorbing the indoor air and exchanging the air with cool air, and then discharging the air. So, the discharged air . . . " included in the second text data as input data, and train the second neural network model with the output data in accordance thereto as "the problem of the smell of the air conditioner (category ID: 1500)." Accordingly, in case the input second text data includes "Use after ventilation" or "The air conditioner uses an air circulating method of absorbing the indoor air and exchanging the air with cool air, and then discharging the air. So, the discharged air . . . ," the second neural network model may be trained to output "the problem of the smell of the air conditioner (category ID: 1500)" as category information corresponding thereto.

As another example, the electronic device 100 may train the second neural network model using data in various forms that a counselor provided as response information, other than the second text data corresponding to the second voice. For example, the electronic device 100 may train the second neural network model using an image regarding a method of replacing an air conditioner filter as input data, and with the output data in accordance thereto as "the problem of the smell of the air conditioner (category ID: 1500)." Accordingly, in case input data is an image regarding a method of replacing an air conditioner filter, the second neural network model may output "the problem of the smell of the air conditioner (category ID: 1500)" as category information corresponding thereto.

As still another example, in case a counselor provided a moving image regarding a method of dealing with the problem of the smell of the air conditioner based on a customer's inquiry, the electronic device 100 may train the second neural network model using video image data. For example, the electronic device 100 may extract a subtitle (a text) from the moving image. For example, in case the moving image includes a text such as "Please remember that you can reduce occurrence of smell if you finish driving of the air conditioner and then use it after ventilating the indoors," the electronic device 100 may extract such a text and use the text as input data of the second neural network model. Accordingly, if a text such as "Please remember that you can reduce occurrence of smell if you finish driving of the air conditioner and then use it after ventilating the indoors" or a moving image including such a text is input as input data, the second neural network model may output "the problem of the smell of the air conditioner (category ID: 1500)" as category information corresponding thereto.

In other words, even in a case where data input into the second neural network model is an image or a moving image which is not in the form of text data, the second neural network model may output category information corresponding thereto.

Accordingly, in case texts such as "Use after ventilation" and "The air conditioner uses an air circulating method of absorbing the indoor air and exchanging the air with cool air, and then discharging the air. So, the discharged air . . . ," an image regarding a method of replacing an air conditioner filter, or a moving image including a text such as "Please remember that you can reduce occurrence of smell if you finish driving of the air conditioner and then use it after ventilating the indoors" are input into the second neural network model, the second neural network model may be trained to output "the problem of the smell of the air conditioner (category ID: 1500)" as category information corresponding thereto.

The second neural network model may be trained based on at least one of predetermined manual data regarding responses or frequently asked questions (FAQ) data in addition to data related to a counselor's voice. As predetermined manual data or FAQ data is data of which category information has already been classified, there is no need to separately proceed with a step of acquiring category information. Accordingly, the electronic device 100 may train the second neural network model using response manual data as input data, and using category information in accordance thereto as output data. As described above, category information of manual data or FAQ data has already been acquired, and thus the second neural network model may be trained without a process of matching a response content and category information separately.

Figure 7:
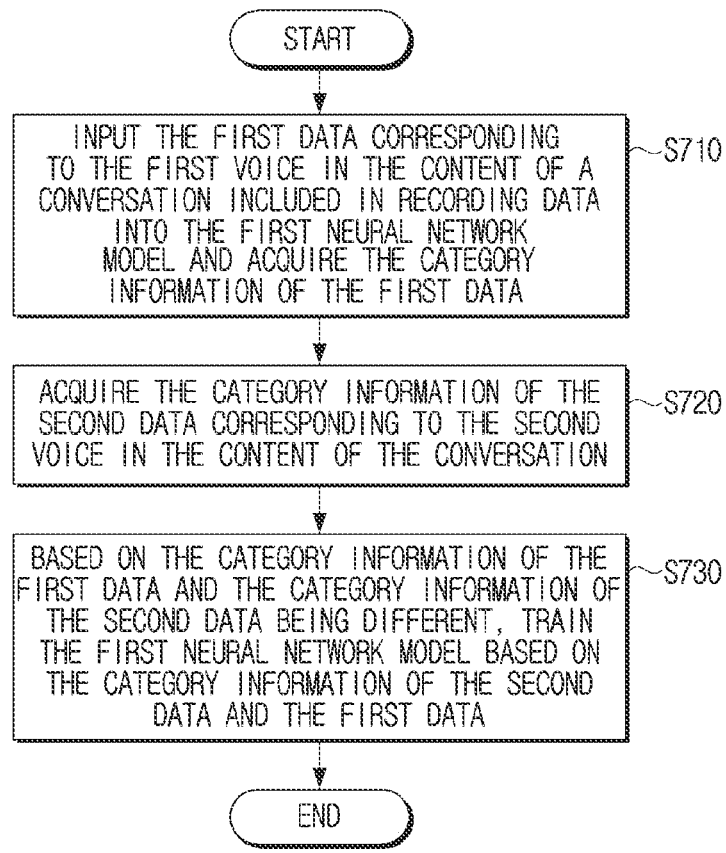
FIG. 7 is a flowchart illustrating an example method of controlling an electronic device according to an embodiment of the disclosure.

FIG. 7 is a flowchart illustrating an example method of controlling an electronic device according to an embodiment of the disclosure.

The electronic device 100 may input the first data corresponding to the first voice in the content of a conversation included in recording data into the first neural network model and acquire the category information of the first data as a result of inputting the first data into the first neural network model at operation S710. Here, the recording data is data including the content of counseling between a customer and a counselor, and the first voice may be the voice of the customer, and the second voice that will be described below may be the voice of the counselor.

The electronic device 100 may identify the second voice in the recording data based on voice profile information related to the pre-stored data corresponding to the second voice.

The electronic device 100 may acquire the category information of the second data corresponding to the second voice in the content of the conversation at operation S720.

The electronic device 100 may input the data corresponding to the second voice into the second neural network model and acquire the category information of the data corresponding to the second voice.

For example, the electronic device 100 may input a sentence acquired by combining at least some of each of a plurality of sentences included in the data corresponding to the second voice into the second neural network model and acquire the category information of the data corresponding to the second voice.

If at least one of text data or image data related to the second voice is acquired from at least one of moving image data, image data, or text data, the electronic device 100 may input the acquired data into the second neural network model and acquire the category information of the data corresponding to the second voice.

If the category information of the first data and the category information of the second data are different, the electronic device 100 may train the first neural network model based on the category information of the second data and the first data at operation S730.

The electronic device 100 may sequentially input text data corresponding to each of a plurality of sentences included in the data corresponding to the second voice into the second neural network model, acquire at least one category information corresponding to each of the plurality of sentences and the first probability value corresponding to the at least one category information from the second neural network model, input text data corresponding to a sentence acquired by combining at least some of each of the plurality of sentences into the second neural network model, acquire at least one category information corresponding to the acquired sentence and the second probability value corresponding to the at least one category information from the second neural network model, and train the first neural network model based on a sentence selected based on the first probability value and the second probability value and the category information corresponding to the selected sentence.

As an example, the electronic device 100 may select a sentence having the probability value greater than or equal to a threshold value between the first probability value and the second probability value, and train the first neural network model based on the selected sentence and the category information corresponding to the selected sentence.

In case a connective word is included in a sentence acquired by combining at least some of each of a plurality of sentences, the electronic device 100 may apply a weight value to the probability value corresponding to the acquired sentence based on at least one of the type or the number of times of the connective word.

After the first neural network model is trained according to the aforementioned step, if user voice data is input, the electronic device 100 may input text data corresponding to the user voice data into the trained first neural network model, and acquire the category information corresponding to the user voice data, and acquire response information corresponding to the user voice data based on the category information.

Methods according to the aforementioned various example embodiments of the disclosure may be implemented in the forms of applications that can be installed on conventional electronic devices.

Methods according to the aforementioned various example embodiments of the disclosure may be implemented by software upgrade, or hardware upgrade for conventional electronic devices.

The aforementioned various example embodiments of the disclosure may be performed through an embedded server provided on an electronic device, or at least one external server of an electronic device.

According to an embodiment of the disclosure, the various embodiments described above may be implemented as software including instructions stored in machine-readable storage media, which can be read by machines (e.g.: computers). The machines may refer, for example, to devices that call instructions stored in a storage medium, and can operate according to the called instructions, and the devices may include the electronic device according to the aforementioned embodiments. In case an instruction is executed by a processor, the processor may perform a function corresponding to the instruction by itself, or using other components under its control. An instruction may include a code made by a compiler or a code executable by an interpreter. A storage medium that is readable by machines may be provided in the form of a non-transitory storage medium. The 'non-transitory' storage medium does not include signals, and is tangible, but does not indicate whether data is stored in the storage medium semi-permanently or temporarily. For example, 'a non-transitory storage medium' may include a buffer wherein data is temporarily stored.

According to an embodiment of the disclosure, the methods according to the aforementioned various embodiments may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g, Playstore™). In the case of on-line distribution, at least a portion of a computer program product may be stored in a storage medium such as the server of the manufacturer, the server of the application store, and the memory of the relay server at least temporarily, or may be generated temporarily.

In addition, according to an embodiment of the disclosure, the aforementioned various embodiments may be implemented in a recording medium that can be read by a computer or a device similar to a computer, using software, hardware, or a combination thereof. In some cases, the embodiments described in this specification may be implemented by a processor itself. According to implementation by software, the embodiments such as processes and functions described in this disclosure may be implemented by separate software modules. Each of the software modules can perform one or more functions and operations described in this specification.

Computer instructions for performing processing operations of machines according to the aforementioned various embodiments may be stored in a non-transitory computer-readable medium. Computer instructions stored in such a non-transitory computer-readable medium make the processing operations at machines according to the aforementioned various embodiments performed by a specific machine, when the instructions are executed by the processor of the specific machine.

A non-transitory computer-readable medium may include a CD, a DVD, a hard disc, a blue-ray disc, a USB, a memory card, a ROM and the like.

Each of the components according to the aforementioned various embodiments (e.g., a module or a program) may include a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

While various example embodiments of the disclosure have been illustrated and described, it will be understood that the various example embodiments are intended to be illustrative, not limiting, and it is also apparent that various modifications can be made by those having ordinary skill in the art to which the disclosure belongs, without departing from the true spirit and full scope of the disclosure, including the appended claims.

What is claimed is:

1. An electronic device comprising:
   a memory storing recording data including a content of a conversation between a customer user and a counselor user, the conversation including a first voice corresponding to the customer user and a second voice corresponding to the counselor user, and at least one instruction; and
   at least one processor configured, by executing the at least one instruction, individually and/or collectively, to:
      input first data corresponding to the first voice in the content of the conversation into a neural network model and acquire first text corresponding to the first data, and category information of the first data identified from content of the first text output by the neural network model,
      input second data corresponding to the second voice in the content of the conversation into the neural network model and acquire second text corresponding to the second data and category information of the second data identified from content of the second text output by the neural network model,
      select first selected text from the first text and second selected text from the second text corresponding to at least one form of content from among a plurality of predefined forms, wherein at least a portion of the first text is excluded from the first text and at least a portion of the second text is excluded from the selected second text, and
      train the neural network model based on the category information of the first data, the category information of the second data, the first selected text, and the second selected text,
   wherein the category information of the first data and the category information of the second data are different,
   wherein the category information of the first data and the category information of the second data are classified according to a predetermined depth,
   wherein the first voice includes a customer inquiry corresponding to the customer user,
   wherein the second voice is uttered after the first voice, and
   wherein the second voice includes a response of the customer inquiry corresponding to the counselor user,
   wherein the at least one processor is configured to:
   sequentially input text data corresponding to each of the plurality of sentences included in the data corresponding to the second voice into the neural network model, and acquire at least one category information corresponding to each of the plurality of sentences and a first probability value corresponding to the at least one category information from the neural network model,
   input text data corresponding to the sentence acquired by combining at least a portion of each of the plurality of sentences into the neural network model, and acquire at least one category information corresponding to the acquired sentence and a second probability value corresponding to the at least one category information from the neural network model, and train the neural network model based on a sentence selected based on the first probability value and the second probability value and the category information corresponding to the selected sentence.

2. The electronic device of claim 1, wherein the memory stores voice profile information related to data corresponding to the second voice, and the at least one processor is configured to: identify the second voice in the recording data based on the stored voice profile information.

3. The electronic device of claim 1, wherein the neural network model comprises a first neural network model and a second neural network model, and the at least one processor is configured to:

input the first data corresponding to the first voice into the first neural network model and acquire the category information of the first data based on output of the first neural network; and input the second data corresponding to the second voice into the second neural network model and acquire the category information of the second data based on output of the second neural network.

4. The electronic device of claim 1, wherein the category information of the first data and the category information of the second data is selected from a plurality of predefined categories.

5. The electronic device of claim 1, wherein the at least one processor is configured to: train the neural network model based on the category information of the first data, the category information of the second data, the first text corresponding to the first data and the second text corresponding to the first data.

6. The electronic device of claim 3, wherein the at least one processor is configured to:

based on acquiring at least one of moving image data, text data, or image data related to the second voice from at least one of moving image data, image data, or text data, input the acquired data into the second neural network model and acquire the category information of the data corresponding to the second voice.

7. The electronic device of claim 1, wherein the neural network model includes a voice recognition model configured to recognize the first voice in the content and output the first text corresponding to the first data.

8. The electronic device of claim 1, wherein the second selected text includes a plurality of sentences and the at least one processor is configured to:

input text data corresponding to each of the plurality of sentences into the neural network model, and acquire at least one first category information corresponding to each of the plurality of sentences and a first probability value corresponding to the at least one first category information from the neural network model, input text data corresponding to a combined sentence acquired by combining at least a portion of each of the plurality of sentences into the neural network model, and acquire at least one second category information corresponding to the acquired sentence and a second probability value corresponding to the at least one second category information from the neural network model, and train the neural network model based on the first probability value and the second probability value.

9. A method of controlling an electronic device storing recording data including a content of a conversation between a customer user and a counselor user, the conversation including a first voice corresponding to the customer user and a second voice corresponding to the counselor user, the method comprising:

inputting first data corresponding to the first voice in the content of the conversation into a neural network model and acquiring first text corresponding to the first data and category information of the first data identified from content of the first text output by the neural network model;

inputting second data corresponding to the second voice in the content of the conversation into the neural network model and acquiring second text corresponding to the second data and category information of the second data identified from content of the second text output by the neural network model;

select first selected text from the first text and second selected text from the second text corresponding to at least one form of content from among a plurality of predefined forms, wherein at least a portion of the first text is excluded from the first text and at least a portion of the second text is excluded from the selected second text; and training the neural network model based on the category information of the first data, the category information of the second data, and the first selected text, and the second selected text corresponding to the second data, wherein the category information of the first data and the category information of the second data are different, wherein the category information of the first data and the category information of the second data are classified according to a predetermined depth, wherein the first voice includes a customer inquiry corresponding to the customer user, wherein the second voice is uttered after the first voice, and wherein the second voice includes a response of the customer inquiry corresponding to the counselor user, wherein the training the neural network model comprises:
sequentially inputting text data corresponding to each of the plurality of sentences included in the data corresponding to the second voice into the neural network model, and acquiring at least one category information corresponding to each of the plurality of sentences and a first probability value corresponding to the at least one category information from the neural network model;

inputting text data corresponding to the sentence acquired by combining at least a portion of each of the plurality of sentences into the neural network model, and acquiring at least one category information corresponding to the acquired sentence and a second probability value corresponding to the at least one category information from the neural network model; and training the neural network model based on a sentence selected based on the first probability value and the second probability value and the category information corresponding to the selected sentence.

10. The method of claim 9, further comprising:
identifying the second voice in the recording data based on voice profile information related to pre-stored data corresponding to the second voice.

11. The method of claim 9, wherein the neural network model comprises a first neural network model and a second neural network model and the acquiring the category information of the first and second data comprises:
- inputting the first data corresponding to the first voice into the first neural network model and acquiring the category information of the first data based on output of the first neural network; and
- inputting the second data corresponding to the second voice into the second neural network model and acquiring the category information of the second data based on output of the second neural network.

12. The method of claim 9, wherein the category information of the first data and the category information of the second data is selected from a plurality of predefined categories.

13. The method of claim 9, further comprising: training the neural network model based on the category information of the first data, the category information of the second data, the first text corresponding to the first data and the second text corresponding to the first data.

14. The method of claim 11, wherein the acquiring the category information of the second data comprises:
- based on acquiring at least one of moving image data, text data, or image data related to the second voice from at least one of moving image data, image data, or text data, inputting the acquired data into the second neural network model and acquiring the category information of the data corresponding to the second voice.

15. The method of claim 9, wherein the neural network model includes a voice recognition model configured to recognize the first voice in the content and output the first text corresponding to the first data.

\* \* \* \* \*